July 26, 1927.

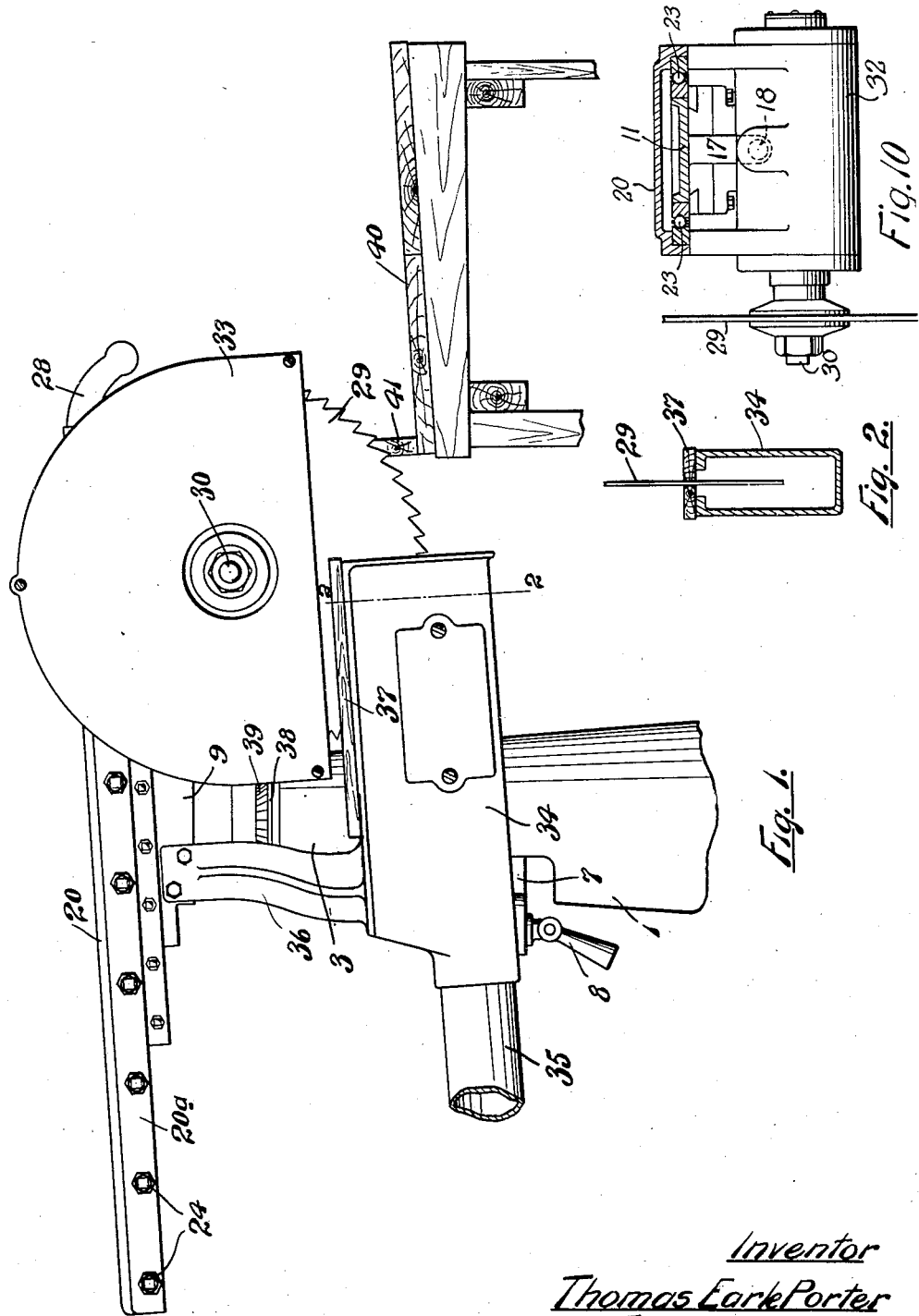

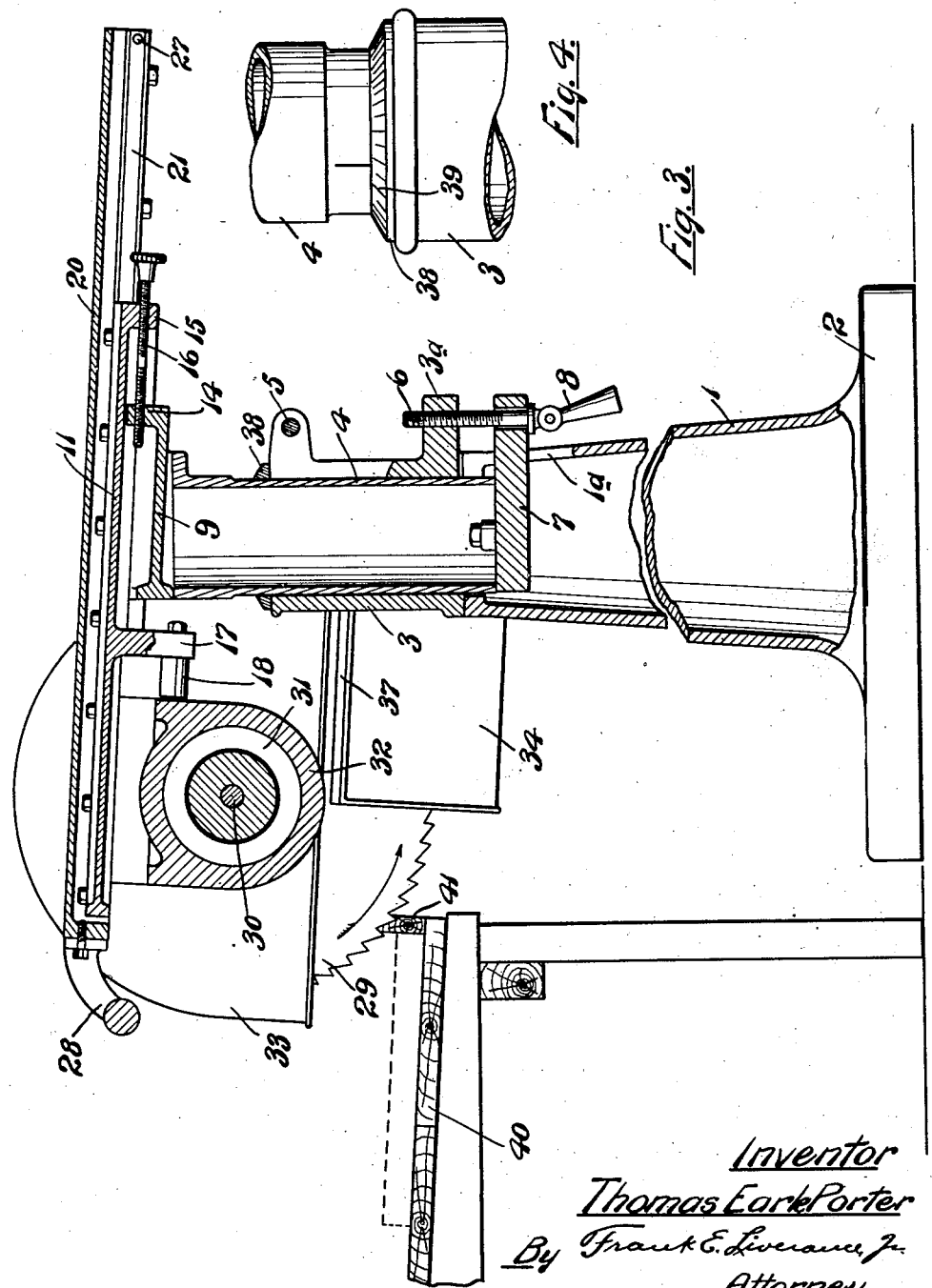

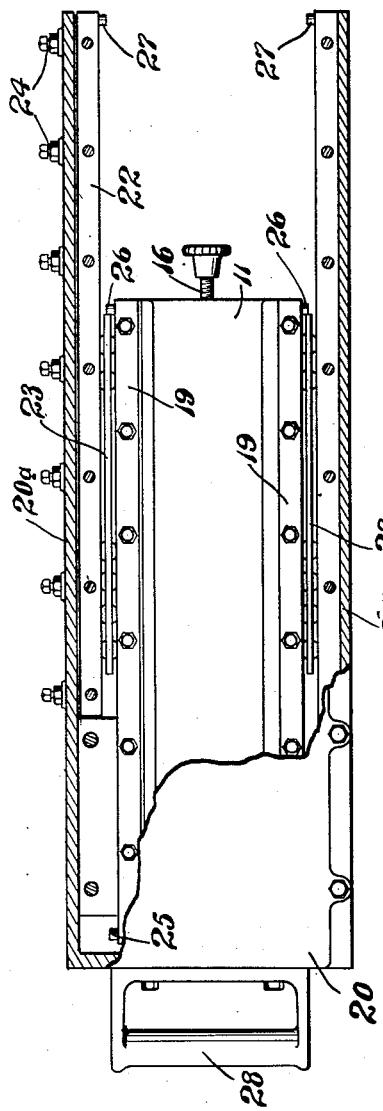
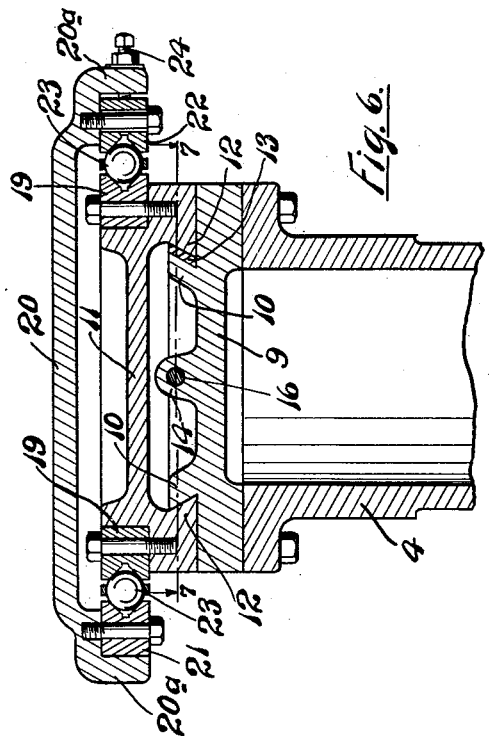
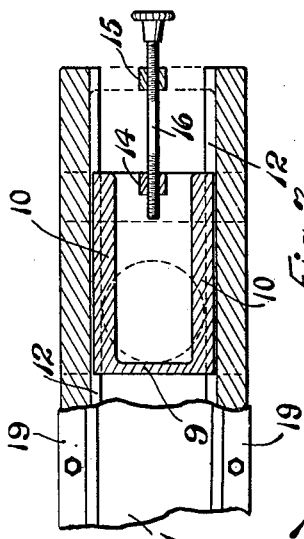

T. E. PORTER

CUT-OFF SAW

Filed April 28, 1924

Inventor
Thomas Earle Porter
By Frank E. Liverance, Jr.
Attorney

Patented July 26, 1927.

1,636,924

UNITED STATES PATENT OFFICE.

THOMAS EARLE PORTER, OF GRAND RAPIDS, MICHIGAN.

CUT-OFF SAW.

Application filed April 28, 1924. Serial No. 709,334.

This invention relates to a cut-off saw to be used in wood working. It is a primary object and purpose of the present invention to make a saw of this character wherein the saw is moved toward and away from the work. A further object of the invention is to make a saw of this character and mount the same for a wide range of adjustment, either vertically, about a vertical axis, and also horizontally with respect to the work to be acted upon, each of said adjustments being independent of any other so that a wide range of work may be accommodated. A yet further object of the invention is to make and mount a saw of this character that it may act not only as a cut-off saw when desired, but may also be adjusted to be used as a dadoing saw or cutter without change in the construction of the machine. These and many other objects and purposes not specifically outlined at this time will be apparent as understanding of the invention is had from the following description, taken in connection with the accompanying drawings, in which, Fig. 1 is a side elevation of the cut-off saw of my invention and the work holding table used therewith.

Fig. 2 is a vertical transverse section taken substantially on the plane of line 2—2, of Fig. 1.

Fig. 3 is a central vertical section through the machine.

Fig. 4 is a fragmentary enlarged elevation of the pedestal of the machine and illustrating the adjustment indicator used for the adjustment about a vertical axis.

Fig. 5 is a fragmentary partial plan and horizontal section through the upper portion of the machine to show the movable mount of the upper table on which the saw is carried.

Fig. 6 is a fragmentary enlarged vertical section taken transversely through said upper table construction and mounting therefor.

Fig. 7 is a horizontal section substantially on the plane of line 7—7, of Fig. 6.

Fig. 10 is a fragmentary transverse vertical section taken just forward of the motor, showing the preferred construction.

Like reference characters refer to like parts in the different figures of the drawings.

Figure 8:
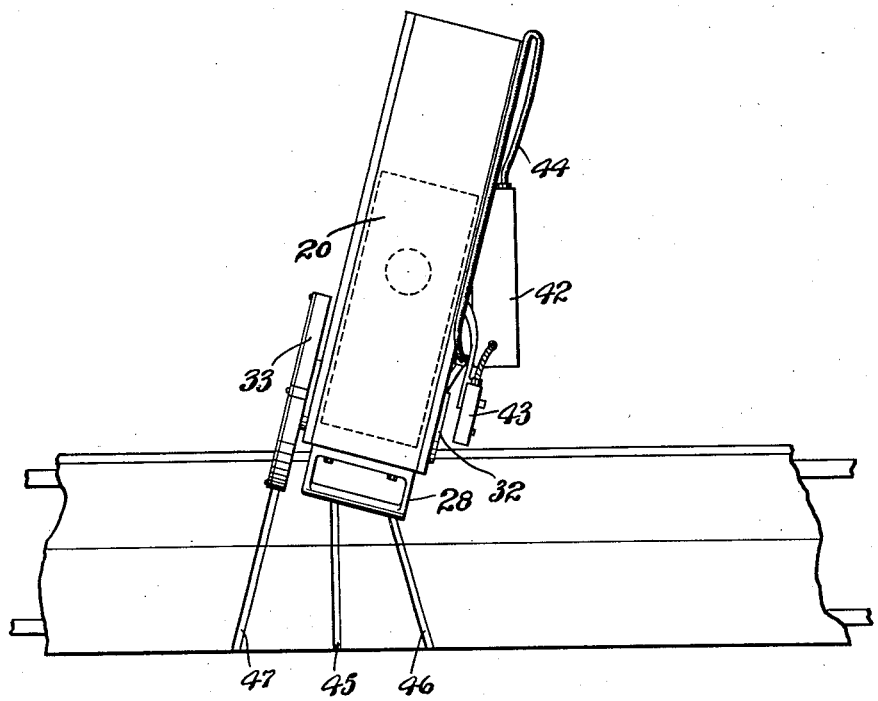
Fig. 8 is a plan view of the cut-off saw machine.

In the construction, a pedestal support in the form of a hollow post 1 having an enlarged supporting base 2 is provided, at its upper end having a sleeve extension 3 thereto which is made as a separate member and permanently secured in place in any suitable manner. A cylinder 4 is slidably mounted in and extends through the part 3 and is adapted to be adjusted up and down therein, the sleeve 3 being vertically slotted at its upper end at one side and provided with outwardly extending ears at each side of the slot for the passage of a bolt 5 therethrough which may be tightened to hold the cylinder 4 in any position to which adjusted. Below the ears through which bolt 5 passes, the said sleeve 3 is formed with an outwardly extending lug 3ª and an adjusting screw 6 threads upwardly therethrough, also passing freely through a member 7 on which the lower end of the cylinder 4 rests and on which it may be turned. Said member 7 is located within the post 1 and extends through an opening 1ª in its side as shown in Fig. 3. A handle 8 on the lower end of the adjusting screw 6 is provided for manual operation of the screw, and it is evident that cylinder 4 and whatever devices are carried at the upper end thereof may be vertically adjusted within certain limits of adjustment.

At the upper end of the cylinder 4 a saddle 9 is permanently connected by bolts, as shown in Fig. 6. At its upper side said saddle is formed with two spaced apart parallel ribs 10 extending from what may be termed the front of the machine toward the rear. It will be noted that the saddle and said ribs thereon have a downward inclination from front to rear. On the ribs 10, a lower table 11 is mounted, being formed with downwardly extending parallel guides 12 at its sides which are shaped to fit the ribs 10, a suitable gib 13 being interposed between one of the ribs 10 and its associated guide for taking up wear, as indicated in Fig. 6. A lug 14 is cast integral with and projects upwardly from the rear end of the saddle 9 and a like lug 15 extends downwardly from the rear end of the table 11. A rod 16, having its opposite end portions oppositely threaded is passed through said lugs and provided at its rear end with an operating handle for manual operation, whereby it is evident that the table 11 may be moved and adjusted to different positions with respect to the saddle 9. A lug 17 is also cast integral with the table 11 and extends downwardly therefrom in front of the saddle, at the front side of which a stop bumper 18, preferably of rubber is secured, the purpose of which will later appear.

Two bars 19 are attached to the lower table 11 in parallelism at opposite sides and at the upper portion of said table having ball race grooves in their outer sides. An upper table 20 lies directly over the lower table 11 and is formed with downwardly turned side portions 20ª at opposed side edges to which other ball race bars 21 and 22 are permanently secured, grooved on their inner sides and lying alongside the bars 19, suitable balls and retainer bars therefor being interposed between the bars 19 and 21 and 22 so that the upper table has a free movement back and forth on the lower table 11. It will be noted that the bar 22 has openings through it somewhat larger in diameter than the diameters of the bolts or cap screws used in attaching the bar to the upper table 20. This permits a limited adjustment of the bar which may be done through adjusting screws 24 passing through a depending side 20ª of the table 20, as best shown in Fig. 6, said screws 24 being equipped with lock nuts to lock the same in any position to which adjusted.

The bars 19 at the front and rear ends thereof are provided with short horizontally extending stop pins 25 and 26, respectively. The bars 21 and 22 are equipped with like stop pins 27 at their rear ends (see Fig. 5). When the table 20 is moved forward, as it may be done by grasping the handle 28 attached at the front end thereof, the balls and retainer bars 23 are moved forward until the front ends of the ball retainer bars come against the stops 25. The pins 27 pass by the pins 26 and at about the time the retainer bars at their front ends, reach the pins 25, the pins 27 strike against the rear ends of the retainer bars. In the rearward direction of movement the rear ends of said ball retainer bars strike against and are stopped by the pins 26 substantially at the time the front depending end of the upper table 20 comes to the like front end of the lower table 11.

The saw 29 is a circular saw of usual construction, secured at one end of a shaft 30 which may be a continuation of or rigidly attached to the shaft of an electric motor 31, the casing 32 of which lies below the front ends of the two tables 11 and 20 when the saw is at its rearmost position, as shown in Fig. 3, said casing 32 being connected with the upper table 20 to move therewith, it being evident that the saw moves back and forth with the back and forth movements of the said table 20. The saw is covered at its upper portion and to below its center by the usual guard 33.

The machine is provided with a chip casing 34 having an open front end with sides and bottom of metal, a pipe 35 leading from the rear end. By a suitable suction arrangement acting on the pipe 35, chips, sawdust and the like are drawn into the front open end of the casing 34 and carried away through the pipe. The casing 34 may be supported by a member 36 attached thereto and to the saddle 9, as shown in Fig. 1. The open upper side of casing 34 is covered by a wooden cover plate 37 and the passage for the saw is cut by the saw itself in the wood, this being possible due to the ability to move the saw forward in front of the front edge of the cover 37 and then move it to the rear with the saw running, the cutting of the slot for the passage of the saw being readily accomplished.

At the upper end of the sleeve extension 3, a collar 38 is secured on which suitable indicator lines are cut for the purpose of indicating the angle of adjustment of the cylinder 4 about its vertical axis.

The work holding table 40 located in front of the saw is preferably inclined to the horizontal at the same angle as the table 20 is inclined. At its edge nearest the saw, a guard rail 41 is attached to hold the work from falling off the table, it being understood that suitable openings are made between the ends of the guard rails 41 and the ends of the table sections 40 for the passage of the saw when it is moved forward to act on the work.

The electric control box 42, shown in Fig. 8, is preferably mounted on the post 1 at the side thereof opposite the chip casing 34. The switch 43 is located in convenient reach of the operator of the machine, and the electric wiring is carried in a cable 44 to the motor, all being out of the way of the saw and not liable to be injured during the working of the machine.

With a cut-off saw of this character, the operator grasps the handle 28 and moves the saw forward to act on the work to be cut. The roller bearing mounting of the saw carrying table makes this movement easy, and the downward inclination of the tables 11 and 20 to the rear automatically causes the saw to take its rear position when free to do so, thereby insuring that the saw will not be out ahead of its rear position except when designedly drawn out. The adjustment provided by the screw 15 permits that the saw shall be moved as far forward as possible so that as soon as it is grasped and drawn forward it will immediately engage with the work to be sawed, and when a saw of somewhat greater diameter is used, or when in filing the saw its diameter is reduced, proper operation of the screw will suffice for the positioning of the saw so that when the motor casing 32 engages with the stop bumper 18, the saw will just clear the work. The rotary adjustment of the cylinder 4 about a vertical axis permits a positioning of the saw so as to cut the work at a desired angle, and the indicator at 39 makes it easy to adjust to the required angle. The vertical adjustment of the cylinder 4 makes it possible to elevate the saw to a desired position so that it may be placed with reference to the work that it will cut only partly through the same, the saw in such case performing a dadoing operation due to such elevation and the permitted forward movement of the saw. The inclination of the table 40 to the horizontal at the same angle as the inclination of the saw carrying table 20 insures that the saw cut in dadoing shall be of the same depth and in addition aids in insuring that the work operated upon shall be properly engaged against the front rail 41 of the work holding table.

Figure 9:
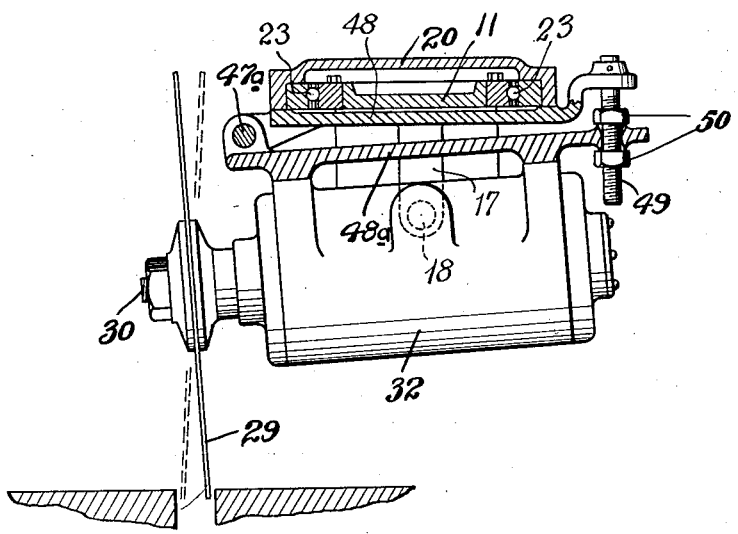
Fig. 9 is a fragmentary transverse vertical section through a modified form of construction showing a mounting for the saw permitting adjustment of the saw to different angular positions with reference to a vertical plane.

As shown in Fig. 8, the saw cut or the dadoing may be at right angles to the table, as at 45 or at any other desired angle, as at 46 and 47. In Fig. 9, a slight modification is shown wherein the saw may be tilted so that it lies in a plane inclined to the vertical. In such construction, the motor 32 may be mounted on a cross member 48ª pivotally mounted at 47ª at one end on a member 48 lying under and connected to the table 20, an adjusting screw 49 being attached to the other end of the part 48 and passing downwardly through an opening in the member 48ª with nuts 50 on said screw above and below the said member 48ª, as shown. This allows a limited range of adjustment of the saw away from a vertical plane which may be desirable at times, particularly in some classes of dadoing.

The construction described is very practical and effective and has so proved in practice. The invention is defined in the appended claims and is to be considered as comprehensive of all forms of structure coming within their scope.

I claim:

1. In a machine of the class described, a vertical support, a cylinder mounted in and extending above the upper end of the support, means for raising or lowering the cylinder, a guide carried by the upper end of the cylinder and having a downward inclination from front to rear, a table reciprocably mounted on said guide and movable in the same inclined plane therewith and a saw carried at the forward end of the table.

2. In a machine of the class described, a vertical support, a saddle permanently secured at the upper end of the support, an elongated table located above the saddle and slidably mounted thereon, means for longitudinally adjusting said table to different positions on the saddle, a second elongated table mounted on and above the first table for reciprocatory movements in the direction of the length of said tables, and a saw rotatably mounted on said second table at one end thereof, substantially as described.

3. In a machine of the class described, a vertical support, a saddle permanently attached to the upper end of the support and having a downward inclination from front to rear, parallel spaced apart ribs projecting from the upper side of the saddle, an elongated table formed with guide members to slidably engage said ribs, means connecting the table and saddle for adjustment of the table longitudinally on said saddle, a second table mounted on and lying above the first table for movements back and forth in the direction of the length of said tables, and a saw rotatably mounted on the second table at the front higher end thereof, substantially as described.

4. In combination, a vertical support, an elongated table mounted for reciprocatory movements at the upper end of the support to move from front to rear and vice versa, said table being inclined downwardly from front to rear, a saw rotatably mounted on the table at the front end thereof, and a work holding table in front of said support inclined downwardly toward the support at the same angle as the downward inclination of the said table from front to rear, substantially as described.

5. In combination, a vertical support, a vertical cylinder carried in the upper end of the support and extending above the support, means for raising or lowering said cylinder, an elongated table mounted for reciprocatory movements at the upper end of the support to move from front to rear and vice versa, said table being inclined downwardly from front to rear, a saw rotatably mounted on the table at the front end thereof, and a work holding table located in front of said support and inclined downwardly toward the support at the same angle as the downward inclination of the table from front to rear.

6. In combination, a vertical support, a table mounted for reciprocatory movements at the upper end thereof, a saw rotatably mounted at one end of the table, means for limiting the movement of the table in each direction, and means for adjusting the table to vary its longitudinal movements with respect to the support, substantially as described.

7. In combination, a vertical support, a table mounted for reciprocatory movements at the upper end thereof, a saw rotatably mounted at one end of the table, means to drive the saw, means for limiting the movement of the table in either direction, and adjusting means for longitudinally changing the position of the table with respect to said support independent of the reciprocatory movements of the table.

In testimony whereof I affix my signature.

THOMAS EARLE PORTER.